(12) United States Patent
Box et al.

(10) Patent No.: US 8,473,959 B2
(45) Date of Patent: Jun. 25, 2013

(54) METHODS AND APPARATUS RELATED TO MIGRATION OF CUSTOMER RESOURCES TO VIRTUAL RESOURCES WITHIN A DATA CENTER ENVIRONMENT

(75) Inventors: Julian J. Box, St Helier (JE); Kevin D. Reid, Bethesda, MD (US); Adam J. L. Ryan, Watford (GB)

(73) Assignee: Virtustream, Inc., Bethesda, MD (US)

( * ) Notice: Subject to any disclaimer, the term of this patent is extended or adjusted under 35 U.S.C. 154(b) by 360 days.

(21) Appl. No.: 12/709,954

(22) Filed: Feb. 22, 2010

(65) Prior Publication Data

US 2011/0209156 A1 Aug. 25, 2011

(51) Int. Cl.
  *G06F 9/46* (2006.01)
(52) U.S. Cl.
  USPC .......................................... 718/104; 718/105
(58) Field of Classification Search
  None
  See application file for complete search history.

(56) References Cited

U.S. PATENT DOCUMENTS

| | | | |
|---|---|---|---|
| 7,194,616 B2 | 3/2007 | Axnix | |
| 7,664,110 B1 | 2/2010 | Lovett | |
| 7,908,605 B1 | 3/2011 | Graupner | |
| 7,941,804 B1 | 5/2011 | Herington | |
| 2002/0059427 A1 | 5/2002 | Tamaki | |
| 2002/0184363 A1 | 12/2002 | Viant et al. | |
| 2003/0028642 A1 | 2/2003 | Agarwal | |
| 2004/0267897 A1 | 12/2004 | Hill | |
| 2005/0039183 A1 | 2/2005 | Romero | |
| 2005/0108712 A1 | 5/2005 | Goyal | |
| 2005/0120160 A1 | 6/2005 | Plouffe | |
| 2005/0235286 A1 | 10/2005 | Ballew | |
| 2006/0056618 A1 | 3/2006 | Aggarwal | |
| 2006/0069594 A1 | 3/2006 | Yamasaki | |
| 2006/0143617 A1 | 6/2006 | Knauerhase | |
| 2006/0161988 A1 | 7/2006 | Costea et al. | |
| 2006/0190606 A1 | 8/2006 | Kohavi | |
| 2006/0259818 A1 | 11/2006 | Howell | |
| 2007/0115924 A1 | 5/2007 | Schneider | |
| 2007/0118567 A1 | 5/2007 | Isokawa | |
| 2007/0250929 A1 | 10/2007 | Herington | |
| 2007/0266433 A1 | 11/2007 | Moore | |
| 2008/0082977 A1* | 4/2008 | Araujo et al. | 718/1 |
| 2008/0163239 A1* | 7/2008 | Sugumar et al. | 718/105 |
| 2008/0183544 A1 | 7/2008 | Matsumitsu | |

(Continued)

FOREIGN PATENT DOCUMENTS

EP 2040176 3/2009

OTHER PUBLICATIONS

Virtustream, Inc. PCT/US11/25392. International Search Report-Written Opinion (Jun. 2, 2011).

(Continued)

*Primary Examiner* — Kenneth Tang
(74) *Attorney, Agent, or Firm* — DLA Piper LLP (US)

(57) ABSTRACT

In one embodiment, a processor-readable medium can be configured to store code representing instructions to be executed by a processor. The code can include code to receive an indicator that a set of virtual resources has been identified for quarantine at a portion of a data center. The code can also include code to execute, during at least a portion of a quarantine time period, at least a portion of a virtual resource from the set of virtual resources at a quarantined portion of hardware of the data center that is dedicated to execute the set of virtual resources in response to the indicator and not execute virtual resources associated with non-quarantine operation.

25 Claims, 4 Drawing Sheets

U.S. PATENT DOCUMENTS

| | | |
|---|---|---|
| 2008/0263258 A1 | 10/2008 | Allwell |
| 2008/0295096 A1 | 11/2008 | Beaty |
| 2009/0138887 A1 | 5/2009 | Keitaro et al. |
| 2009/0199198 A1 | 8/2009 | Horii |
| 2009/0254572 A1 | 10/2009 | Redlich et al. |
| 2009/0276771 A1 | 11/2009 | Nickolov et al. |
| 2009/0293022 A1 | 11/2009 | Fries |
| 2010/0107172 A1 | 4/2010 | Calinescu |
| 2011/0093852 A1 | 4/2011 | Wen-Syan et al. |
| 2011/0185064 A1 | 7/2011 | Head |

OTHER PUBLICATIONS

International Search Report issued in PCT/US2011/025390 on Jun. 1, 2011.

International Preliminary Report on Patnetability and Written Opinion issued in PCT/US2011/025390 on Aug. 28, 2012.

U.S. Appl. No. 12/709,943.

International Search Report issued in PCT/US2011/025393 on Jun. 2, 2011.

International Preliminary Report on Patentability issued in PCT/US2011/025393 on Aug. 28, 2012.

U.S. Appl. No. 12/709,962.

U.S. Appl. No. 13/595,955.

International Search Report issued in PCT/US2012/052561 dated Feb. 7, 2013.

Written Opinion issued in PCT/US2012/052561 dated Feb. 7, 2013,.

* cited by examiner

METHODS AND APPARATUS RELATED TO MIGRATION OF CUSTOMER RESOURCES TO VIRTUAL RESOURCES WITHIN A DATA CENTER ENVIRONMENT

BACKGROUND

Embodiments described herein relate generally to virtual resources within a data center, and, in particular, to migration of customer resources to virtual resources within a data center environment.

Known methods for migrating a function (e.g., a function of an application, a database) associated with, for example, a legacy device to a virtual resource within a data center can be complicated and inefficient. Often these known methods involve labor intensive manual intervention due to various incompatible systems that control and/or manage resources (e.g., hardware resources, software resources) of a data center in a disparate fashion. Even after a function associated with a legacy device has been migrated into a new virtual resource within a data center, the new virtual resource may not be suitable for the particular hardware/software resources of the data center and/or the new virtual resource can adversely affect the operation of existing virtual resources when activated.

Thus, a need exists for methods and apparatus for migration of customer resources to virtual resources within a data center environment.

SUMMARY

In one embodiment, a processor-readable medium can be configured to store code representing instructions to be executed by a processor. The code can include code to receive an indicator that a set of virtual resources has been identified for quarantine at a portion of a data center. The code can also include code to execute, during at least a portion of a quarantine time period, at least a portion of a virtual resource from the set of virtual resources at a quarantined portion of hardware of the data center that is dedicated to execute the set of virtual resources in response to the indicator and not execute virtual resources associated with non-quarantine operation.

DETAILED DESCRIPTION

A management module can include an onboard engine configured to facilitate migration of one or more portions of a source (e.g., a legacy physical device, a legacy application) to a data center (e.g., a cloud computing data center environment). Migration can include the process of converting one or more functions of the source into a virtual resource (e.g., a virtual machine) that can emulate (or replicate) the source and that can be executed within the data center. The onboard engine can be configured to facilitate (e.g., implement) various portions of the migration process, which can include, for example, an assessment phase, a conversion phase, a quarantine phase, a management phase, and/or so forth. During the assessment phase, the hardware and/or software requirements to operate the migrated version (e.g., a virtual resource version) of the source can be performed. During the conversion phase the source can be converted into one or more virtual resources to be executed within the environment of the data center. During the quarantine phase, the virtual resources can be monitored while executing in a quarantined portion (e.g., a physically partitioned portion) of the data center. Finally, during the management phase the virtual resources can be managed (e.g., managed during day-to-day operations) after being moved to a non-quarantined portion of the data center from the quarantined portion of the data center.

Figure 1:
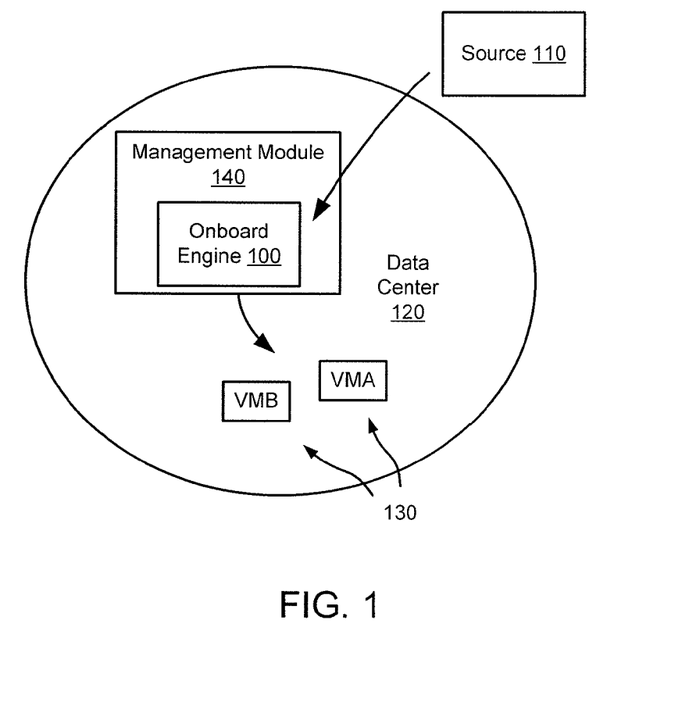
FIG. 1 is a schematic diagram that illustrates an onboard engine configured to facilitate migration of one or more portions of a source to a data center, according to an embodiment.

FIG. 1 is a schematic diagram that illustrates an onboard engine 100 configured to facilitate migration of one or more portions of a source 110 to a data center 120, according to an embodiment. As shown in FIG. 1, the onboard engine 100 can be configured to facilitate migration of the portion(s) of the source 110 to one or more virtual resources 130 (e.g., a set of virtual resources) operating within shared hardware resources (e.g., access switches) and/or software resources (e.g., management modules) of the data center 120. Specifically, the data center 120 can define a virtualized environment where shared hardware and/or software resources (e.g., processing resources, storage resources, management resources) within the data center 120 operate (e.g., execute) virtual resources (such as virtual resources 130) that emulate (or replicate) the functionality of portions of, for example, source 110.

For example, within the virtualized data center environment of the data center 120, a single hardware resource within the data center can be configured to operate one or more applications (e.g., software applications, virtualized applications such as virtual machines) and/or execute one or more functions associated with multiple applications. In some embodiments, the data center 120 can be a cloud computing environment where hardware resources and/or software resources are shared by multiple virtual resources associated with one or more users (e.g., clients, customers). In some embodiments, the virtualized environment defined by the data center can be referred to as a data center virtualized environment.

Figure 2:
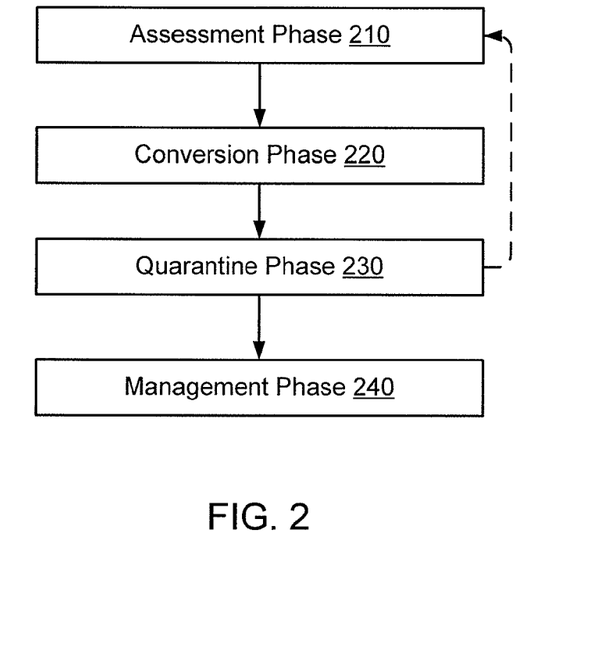
FIG. 2 is a flowchart that illustrates a migration process, according to an embodiment.

In some embodiments, the migration (via a migration process) of the source 110 to the data center 120 using the onboard engine 100 can be performed in various phases. For example, portions of a migration process can be performed in each of an assessment phase, a conversion phase, a quarantine phase, a management phase, and/or so forth. FIG. 2 is a flowchart that illustrates a migration process, according to an embodiment. As shown in FIG. 2, in some embodiments, assessment of data center hardware and/or software requirements to operate the migrated version (e.g., a virtual resource version) of the source 110 (shown in FIG. 1) can be performed during an assessment phase 210. Converting the source 110 into one or more virtual resources 130 (shown in FIG. 1) of the environment of the data center 120 (shown in FIG. 1) can be performed during a conversion phase 220. Monitoring of the virtual resource(s) 130 (which can emulate or replicate at least a portion of the source 110) when in a quarantined portion (not shown) of the data center 120 can be performed during a quarantine phase 230. Finally, management (e.g., day-to-day management) of the virtual resource(s) 130 after the virtual resources have been moved to a non-quarantined portion of the data center 120 can be performed during a management phase 240.

During the quarantine phase 230, the virtual resources 130, which can emulate (or replicate) one or more functions of the source 110, can be monitored within a quarantined portion (not shown) of the data center 120 to determine whether or not the virtual resources 130 will operate within a non-quarantined (also can be referred to as a production environment) of the data center 120 in a desirable fashion. Specifically, the virtual resources 130 can be monitored to determine whether or not the virtual resources 130 will adversely impact performance of the one or more portions of the production environment when released for operation (e.g., execution) within the production environment of the data center 120. The production environment can be an environment where virtual resources (e.g., virtual machines) that have already passed through quarantine can operate.

In some embodiments, the phases shown in FIG. 2 can be subdivided and/or combined into different phases. For example, the assessment phase 210 can be subdivided into separate assessment and profiling phases. The conversion phase 220 can include an alignment phase related to determining operational readiness and/or a migration plan. In some embodiments, the quarantine phase 230 and the management phase 240 can be collectively referred to as a transition phase.

As shown in FIG. 1, the onboard engine 100 can be included in a management module 140 configured to handle various management functions (e.g., data recovery functions, day-to-day management functions) associated with the data center 120. The various management functions can be handled by different modules that are not shown in FIG. 1. More details related to a management module and the functions performed by a management module are set forth in co-pending patent application Ser. No. 13/031,847, filed on same date, entitled, "Methods and Apparatus for Data Center Management Independent of Hypervisor Platform," which is incorporated herein by reference in its entirety.

In some embodiments, the virtual resources 130 can be monitored within the quarantined portion of the data center 120 to determine whether or not the virtual resources 130 are functioning as desired or expected. In some embodiments, one or more virtual resources (e.g., a set of virtual resources) can be monitored within a quarantined portion of a data center to determine whether or not the virtual resource(s) have an undesirable vulnerability (e.g., a security vulnerability) before the virtual resource(s) is released for operation into a non-quarantined environment (e.g., a production environment) of the data center. In some embodiments, the quarantined portion of the data center 120 can be a physical partition of the data center 120 that is separated from the non-quarantined portion of the data center 120. In such instances, the quarantined portion of the data center 120 can be dedicated to execution of virtual resources 130 and not execute virtual resources (not shown) associated with non-quarantine operation (e.g., virtual resources within the production environment).

As shown in FIG. 2, data (e.g., statistics, performance metrics) collected during the quarantine phase 230 optionally can be used at the assessment phase 210 in a feedback loop. In other words, feedback from the quarantine phase 230 can be processed during the assessment phase 210. In some embodiments, one or more portions of the method shown in FIG. 2 can be performed at an onboard engine such as onboard engine 100 shown in FIG. 1. In some embodiments, the assessment phase, the conversion phase, the quarantine phase, and/or the management phase can be collectively referred to as an onboarding process or as a migration process. In some embodiments, one or more of the phases, or portions thereof, in the migration process can be performed in a different order, or in a different phase, than described above. More details related to each of the phases of the migration process shown in FIG. 2 are described below.

Returning back to FIG. 1, although not shown, in some embodiments, the hardware resources and/or software of the data center 120 can include one or more levels of infrastructure. For example, in some embodiments, the hardware resources of the data center 120 can include, host devices (e.g., server devices), storage devices, access switches, aggregation devices, routers, core switching elements interface components, cables, and/or so forth. In some embodiments, the data center 120 can be configured so that host devices (which can be configured to host virtual resources) and/or storage devices can be in communication with (e.g., coupled to) a layer of access switches that are in communication with (e.g., coupled to) a layer of aggregation devices. The aggregation devices can function as gateway devices into a set of routers/switches that function as core switching elements of the data center 120.

In some embodiments, the software resources of the data center 120 can include, for example, management modules, operating systems, hypervisors, and/or so forth. The hypervisors can be configured to facilitate virtualization of hardware resources of a host devices. The operating systems can be installed at routers, aggregation devices, routers, core switching elements, and/or forth.

In some embodiments, the data center 120 can be managed locally or can have consolidated management. For example, the entire data center 120, or a portion thereof, can be managed via a single management module (not shown). In some embodiments, the entire data center 120, or a portion thereof, can be managed via a multiple management modules (not shown) that can be distributed through the data center 120 infrastructure. In some embodiments, some functionality of the data center 120 can be managed based on a consolidated management scheme, while the functionality of the data center 120 can be managed based on a distributed management scheme.

In some embodiments, the source 110 can be, for example, a physical device (e.g., a legacy physical device) that has a particular function (or set of functions). For example, in some embodiments, the source 110 can be a physical server configured to operate one or more applications, a host device, a storage device (e.g., a storage device associated with a storage area network (SAN)), a router, a multi-processor system, a file server, an application server, middleware, and/or so forth. Although not shown, in some embodiments, the source 110 can be a network and/or collection of devices that operate independently. In some embodiments, the source 110 can be a general-purpose computational engine that can include, for example, processors, memory, and/or one or more network interface devices (e.g., a network interface card (NIC)). In some embodiments, the source 110 can be an open systems interconnection (OSI) layer-4 through layer-7 device. In some embodiments, the source 110 can be a physical device that is a non-virtualized device.

In some embodiments, the source 110 can be, for example, a software module (e.g., a software application). In some embodiments, the source 110 can have a virtualized environment. In some embodiments, the source 110 can be a virtual resource being migrated to the data center 120 from another virtualized data center environment (not shown).

In some embodiments, the portion of the source 110 that is migrated to the virtual resources 130 (through processing implemented by the onboard engine 100) can be a software portion of the source 110, and/or a hardware portion of the source 110 that has a particular functionality. In some embodiments, one or more portions of the hardware portion of the source 110 can be provisioned as a particular type of hardware within the data center 120 and/or can be emulated (or replicated) as a virtual resource (such as one or more of the virtual resources 130) at the data center 120. In some embodiments, the source 110 can be referred to as a migration source (e.g., a migration source device, a migration source application).

In some embodiments, the source 110 can be a device associated with one or more entities. For example, the source 110 can be controlled by a single entity (e.g., client, customer) and/or multiple entities (e.g., multiple clients, multiple customers). In some embodiments, for example, the source 110 can be a storage area network (SAN) associated with a company.

Although not shown in FIG. 1, in some embodiments, the virtual resources 130 can be configured to execute at one or more devices of the data center 120. For example, the virtual resources VMA and VMB can be virtual resources configured to operate at a single host device of the data center 120.

In some embodiments, the virtual resources 130 can be, for example, resources configured to share underlying hardware resources and/or software resources of the data center 120. In some embodiments, one or more of the virtual resources 130 can be a virtual machine, a software module, a virtualized application and accompanying operating system and/or interface layer, and/or so forth. The virtual resources 130 can be configured to emulate (or replicate) the functionality of the source 110. In some embodiments, the virtual resources can be configured to natively operated within a portion of the data center 120 (e.g., a host of the data center 120) and/or can be hosted within a portion of the data center 120. In some embodiments, the virtual resources 130 can be integrated within and/or configured to operate with a virtual management software module such as a hypervisor (e.g., a VMware hypervisor, a Xen hypervisor, a Hyper-V hypervisor).

In some embodiments, one or more portions of the onboard engine 100 can be (or can include) a hardware-based module (e.g., an application-specific integrated circuit (ASIC), a digital signal processor (DSP), a field programmable gate array (FPGA)) and/or a software-based module (e.g., a module of computer code, a set of processor-readable instructions that can be executed at a processor). Although not shown, in some embodiments, the onboard engine 100 can include one or more memory portions (e.g., a random access memory (RAM) portion, a shift register, a cache) that can be used during operation of one or more functions of the onboard engine 100. In some embodiments, one or more of the functions associated with the onboard engine 100 can be included in different modules and/or combined into one or more modules. The functionality of the modules within an onboard engine 100 are described in connection with FIG. 3.

Figure 3:
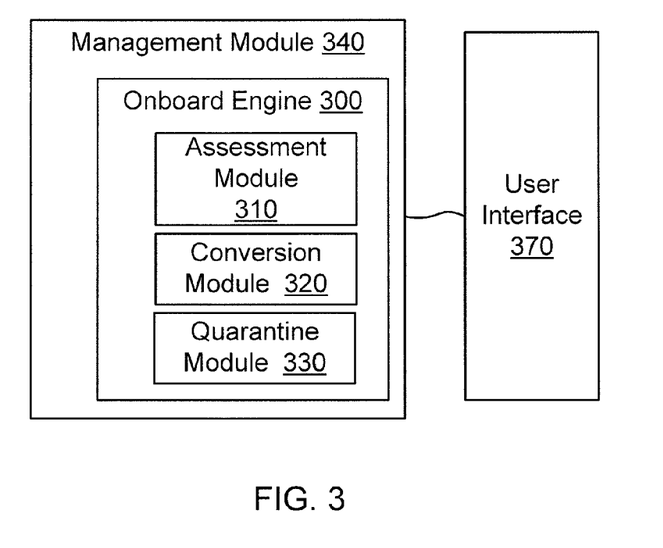
FIG. 3 is a schematic diagram that illustrates modules within an onboard engine, according to an embodiment.

FIG. 3 is a schematic diagram that illustrates modules within an onboard engine 300, according to an embodiment. As shown in FIG. 3, a management module 340 includes the onboard engine 300, which includes an assessment module 310, a conversion module 320, and a quarantine module 330. As shown in FIG. 3, the management module 340 (and onboard engine 300) is in communication with a user interface 370. The assessment module 310 can be configured to handle processing, for example, during an assessment phase (such as the assessment phase 210 shown in FIG. 2) of a migration process. The conversion module 320 can be configured to handle processing, for example, during a conversion phase (such as the conversion phase 220 shown in FIG. 2) of a migration process. The quarantine module 330 can be configured to handle processing during a quarantine phase (such as the quarantine phase 220 shown in FIG. 2) of a migration process. Some portions of the management module 340 can be configured to handle processing, for example, during a management phase (such as the management phase 240 shown in FIG. 2) of a migration process.

As shown in FIG. 3, the onboard engine 300 can be in communication with (e.g., can be accessed via) a user interface 370. The user interface 370 can be configured so that a user (e.g., a data center administrator, a network administrator, a customer, a source owner) can send signals (e.g., control signals, input signals, signals related to instructions) to the onboard engine 300 and/or receive signals (e.g., output signals) from the onboard engine 300. Specifically, the user interface 370 can be configured so that the user can trigger one or more functions to be performed (e.g., executed) at the onboard engine 300 via the user interface 370 and/or receive an output signal (e.g., an output signal representing data) from the onboard engine 300 at, for example, a display (not shown) of the user interface 370. For example, in some embodiments, a user can manage (e.g., update, modify) at least a portion of the onboard engine 300 via the user interface 370. In some embodiments, the user interface 370 can be a graphical user interface (GUI).

In some embodiments, the assessment module 310 can be configured to identify (e.g., define, select, determine, project) data center hardware resource and/or software resource requirements for migration of at least a portion of a migration source to virtual resources (or set of virtual resources) of a data center environment. For example, the assessment module 310 can be configured to identify hardware resources and/or software resources within a data center that may be required to operate a virtual resource (e.g., a virtual machine) configured to emulate (or replicate) one or more functions of the migration source. Specifically, the assessment module 310 can be configured to identify a particular type of network card, network configuration, hypervisor platform, host device, routing strategy, virtual machine, and/or so forth of a data center that can enable a migration source to function in a desirable fashion when emulated (or replicated) within the data center in a virtual resource based on empirical data (e.g., empirical/measured performance data, benchmark data) related to the migration source. In some embodiments, the assessment module 310 can be configured to function as a non-invasive profiling tool configured to monitor the environment of a migration source and generate statistics related to the migration source.

The assessment module 310 can be configured to identify hardware resources and/or software resources to operate a virtual machine (emulating or replicating a migration source) based on one or more assessment parameter values. In other words, the assessment module 310 can be configured to identify (e.g., project) the hardware resources and/or software resources that may be needed to operate a virtual machine emulating (or replicating) one or more functions of a migration source based on one or more assessment parameter values. An assessment parameter value can be any type of parameter value used by the assessment module 310 to identify hardware resources and/or software resources to operate a virtual machine configured to emulate (or replicate) a migration source being migrated to a data center environment. In some embodiments, an assessment parameter value can be a parameter value representing performance requirements of a virtual resource when operating within a data center environment. In some other embodiments, an assessment parameter value can be a statistical value that indicates that a migration source that performs in a particular fashion (e.g., performs at a particular speed, operates at a particular network bandwidth, uses a specified level of disk space) can use a particular type of hardware resource and/or software resource to operate in a desirable fashion (e.g., operate within a specified parameter values). In yet some other embodiments, the assessment parameter values can be based on historical data (e.g., statistical data) related to performance of one or more virtual resources.

In some embodiments, an assessment parameter value can be based on a measurement related to a migration source. For example, the assessment module 310 can be configured to receive and/or take one or more measurements related to, for example, a level of computing resources needed to implement (e.g., implement during a specified period of time) a function of a migration source. Based on the measurements, the assessment module 310 can be configured to identify one/or hardware resources and/or software resources that can be used within a data center to implement one or more functions of the migration source in a virtual resource.

In some embodiments, the assessment module 310 can be configured to identify hardware resources and/or software resources to operate a virtual resource (emulating or replicating a migration source) within a specified specification limit(s) such as a utilization level (e.g., a 90% up-time), a speed (e.g., a bandwidth level, a processing speed), a power level, a failure rate, and/or so forth. The specification limits can be referred to as performance limits and can be a type of assessment parameter value. In some embodiments the specified specification limits can be based on a one or more parameter values defined within a service level agreement (SLA).

In some embodiments, the hardware and/or software resources (which can be collectively referred to as a processing resources) within a data center can be divided into data center units. In some embodiments, the assessment module 310 can be configured to identify a specified number (e.g., an integer number) of data center units for operation of a virtual resource(s) (e.g., a virtual machine(s)) configured to emulate (or replicate) one or more functions of a migration source. In some embodiments, the data center can be partitioned into hardware resources of data center units that can function so that the hardware resources of data center units provide a specified guaranteed level of service. For example, in some embodiments, a data center unit can be associated with hardware resources configured to perform at, for example, a specified level of network bandwidth (e.g., 10 megabits/second (Mb/s) of network bandwidth, a specified level of network bandwidth of more than 1 Mb/s of network bandwidth), a specified level of processing speed (e.g., a processor speed of 300 megahertz (MHz), a processor speed of 600 MHz, a specific processor speed of more than 200 MHz), a specified input/output (I/O) speed of a storage device (e.g., a disk I/O speed of 40 I/O operations per second, a specified disk I/O speed of more than 10 IOPS), and/or a specified storage device bandwidth (e.g., a disk bandwidth of 10 Mb/s, a specified level of disk bandwidth of more than 10 Mb/s). A data center unit can also be associated with (or have a reserved portion of) a specified portion of hardware resources. For example, the data center unit(s) 180 can also have a specified level of a storage device (e.g., a disk size of 30 gigabytes (GB), a specified disk size of more than 1 GB) and/or a specified memory space (e.g., a memory storage capacity of 768 megabytes (MB), a specified memory storage capacity of more than 64 MB) allocated to the data center unit. In other words, the data center unit can be managed based on a set of predefined hardware limit values. In some embodiments, resources managed as a data center unit can include different hardware than that described above. In some embodiments, a predefined hardware limit value used to manage at least a portion of a data center unit can be a type of assessment parameter value.

In some embodiments, the assessment module 310 can be configured to identify a minimum portion of resources to operate a virtual resource. For example, the assessment module 310 can be configured to identify (or calculate) a minimum number of data center units (based on one or more assessment parameter values) to operate a virtual resource within a data center environment.

In some embodiments, the set of predefined hardware limit values used to manage hardware resources of a data center unit can be based on statistical data that indicates a particular combination of hardware can be used to operate, for example, a typical set of virtual resources. In some embodiments, hardware resources of a data center unit can be managed based on a set of predefined hardware limit values so that the data center unit can operate a particular type of virtual resource or set of virtual resources in a desirable fashion (within a particular set of performance specifications).

In some embodiments, the assessment module 310 can be configured to determine that a particular number of data center units can be used to operate a virtual resource emulating (or replicating) at least a portion of a migration source. In some embodiments, the number of discrete data center units selected to operate a virtual resource (or set of virtual resources) can be determined by the assessment module 310 based on, for example, an ability of the data center units to handle burst processing levels of the virtual resource(s) and/or an average processing level of the virtual resource(s). More details related to data units are set forth in co-pending patent application Ser. No. 12/709,962, filed on same date, entitled, "Methods and Apparatus Related to Unit-Based Virtual Resources within a Data Center Environment," which is incorporated herein by reference in its entirety.

In some embodiments, the assessment module 310 can be configured to identify hardware resources and/or software resources of a data center for migration of a migration source based on an assessment parameter value such as an availability of the hardware resources and/or software resources of a data center. For example, the assessment module 310 can be configured to determine that a particular set of hardware resources and/or software resources can operate a virtual resource emulating (or replicating) a migration source based on the particular hardware resources and/or software resources being available.

In some embodiments, the assessment module 310 can be configured to identify hardware resources and/or software resources based on an assessment parameter value related to cost (e.g., a monetary cost, a processing cost). In some embodiments, the assessment module 310 can be configured to identify a specific set hardware resources and/or software resources to operate a virtual machine based on cost constraints related to the hardware resources and/or software resources. For example, a hardware resource may be selected to operate a virtual machine because the particular hardware resource is below a specified cost threshold.

In some embodiments, the assessment module 310 can be configured to identify hardware resources and/or software resources to operate a virtual resource (or set of virtual resources) based on response to a questionnaire including one or more queries. In some embodiments, for example, the assessment module 310 can be configured to send one or more queries (e.g., questions) from a questionnaire to the user interface 370. A user can respond to the question(s) via the user interface 370. The responses to the queries can be used by the assessment module 310 as assessment parameter values to facilitate identification of hardware resources and/or software resource to operate a virtual resource.

In some embodiments, the queries within a questionnaire can be linked (e.g., hierarchically linked). For example, a response (or set of responses) to a first set of queries (or first level of queries) can be used to a select a second set of queries (or second level of queries) to be posed to a user via the user interface 370. Specifically, a response to a query related to a technology sector of a migration source of a user can trigger the assessment module 310 to send a query related to a product category within the technology sector. A response to the query from the user via the user interface 370 related to the product category can further trigger the assessment module 310 to send queries (e.g., queries related to performance requirements) and receive subsequent responses that can be used by an assessment module 310 to identify hardware resources and/or software resources of a data center that can be used to operate a virtual resource emulating (or replicating) the migration source in a desirable fashion.

The conversion module 320 can be configured to facilitate conversion of a migration source into virtual resources within the environment of a data center, for example, during an conversion phase (such as the conversion phase 220 shown in FIG. 2) of a migration process. The conversion module 320 can be configured to change one or more portions of the migration source (e.g., files of the migration source, functions of the migration source) into a virtual resource compatible with the data center environment.

In some embodiments, the conversion module 320 can be configured to automatically move one or more functions (e.g., one or more software modules) associated with a migration source to a virtual resource that can be operated within a data center environment. In some embodiments, the conversion module 320 can be configured to change a hardware-implemented source migration function into a software-based virtual resource that can be operated within a data center.

In some embodiments, the conversion module 320 can be configured to define a configuration (e.g., a mapping, an action control list) associated with a virtual resource emulating (or replicating) a migration source. For example, in some embodiments, the conversion module 320 can be configured to load (e.g., upload) one or more configuration files to a virtual resource of the data center. In some embodiments, the configuration file can be translated by the conversion module 320 into a format compatible with a data center environment into which a function of a migration source is being moved.

In some embodiments, the conversion module 320 can be configured to track one or more procedures related to conversion of a migration resource into a virtual resource of a data center environment. For example, the conversion module 320 can be configured to store a checklist (and/or progress related to a checklist) associated with conversion of one or more functions of a migration source into virtual resource of a data center environment. In some embodiments, the tracking can be based on one or more international standards organization (ISO) compliant procedures and/or other predefined standards/procedures. For example, the conversion module 320 can be configured to track one or more portions of an ISO20000 procedure. In some embodiments, the conversion module 320 can be configured to prevent one or more portions of a procedure (e.g., automatic portions of a procedure and/or manual portions of a procedure) from being performed if not in compliance with an ISO procedure. For example, the conversion module 320 can prevent operation of a virtual resource (or a component of a virtual resource) if a portion of an ISO compliant procedure has not been completed in a desirable fashion.

In some embodiments, the conversion module 320 can be configured to trigger one or more events associated with a procedure related to conversion. For example, the conversion module 320 can be configured to prompt a user via the user interface 370 to perform a particular task based on an ISO procedure.

The quarantine module 330 can be configured to monitor virtual resources (after being converted into virtual resources during the conversion phase) when in a quarantined portion of a data center during a quarantine phase (such as the quarantine phase 220 shown in FIG. 2) of a migration process. Specifically, the quarantine module 330 can be configured to monitor one or more virtual resources (e.g., a set of virtual resources) that are configured to emulate (or replicate) one or more functions of a migration source within a quarantined portion of the data center to determine whether or not the virtual resources will operate within a non-quarantined of a data center in a desirable fashion. For example, the virtual resources can be monitored within a quarantined portion of the data center to determine whether or not the virtual resources will operate in a fashion that closely emulates (or replicates) the original functionality of the migration source or a set of benchmarks of the migration source. In some embodiments, hardware and/or software resources that are used to operate a virtual resource within a quarantined portion of a data center during an quarantine phase can be the same as that identified by the assessment module 310 during an assessment phase (or different phase of a migration process).

In some embodiments, the quarantine module 330 can be configured to collect (e.g., measure) one or more performance metrics (which can be referred to as metrics, or as performance metric values) related to the virtual resources when the virtual resources are operating within the quarantined portion of a data center. For example, the quarantine module 330 can be configured to collect a performance metric(s) related to a virtual resource such as a series of utilization values, a processing speed, an error rate, a failure rate, and/or so forth. In some embodiments, the quarantine module 330 can be configured to calculate one or more performance metrics (e.g., performance metric statistics) statistics based on other performance metrics collected by the quarantine module 330. In some embodiments, the quarantine module 330 can be configured to confirm whether or not hardware resources associated with a specified a number data center unit resources (as determined by the assessment module 310) are sufficient to operate the virtual resources (based on operation within the quarantined portion of the data center).

In some embodiments, the quarantine module 330 can be configured to the collect metrics related to a virtual resource within a quarantined portion of a data center periodically, randomly, at specified intervals, in response to an instruction from a user, and/or based on a user preference (which can be stored in a memory (not shown) of the onboard engine 300). In some embodiments, the types of metrics collected by the quarantine module 330 and/or statistics calculated by the quarantine module based on the metrics can be preselected, selected randomly, based on a preference of a user, and/or so forth.

In some embodiments, the metrics collected by the quarantine module 330 can be sent to a user (e.g., a customer, an owner of a virtual resource, a network administrator) via the user interface 370. In some embodiments, a user can be notified via the user interface 370 of one or more metrics when a threshold condition is satisfied. For example, the quarantine module 330 can be configured to send a notification to, for example, the user interface 370 in response to a specified performance metric falling below a specified threshold value defined within a user preference.

In some embodiments, the quarantine module 330 can be configured to collect metrics related to a virtual resource so that a user can modify the operation of the virtual resource based on the metrics. In some embodiments, the quarantine module 330 can be configured to modify automatically a behavior of one or more virtual resources operating within a quarantined portion of a data center based on a metric of the virtual resource collected by the quarantine module 330. For example, the quarantine module 330 can be configured to terminate, reconfigure, or pause operation of a virtual resource based on a performance metric falling below or exceeding a specified threshold value.

In some embodiments, virtual resources can be configured to operate within a quarantined portion of a data center for a specified period of a time. The specified period of time can be referred to as a quarantine time period. In some embodiments, the quarantine module 330 can be define the quarantine time period. In some embodiments, the quarantine module 330 can be configured to modify a quarantine time period associated with a virtual resource based on a metric of the virtual resource collected when the virtual resource is operating within the quarantined portion of the data center. For example, the quarantine module 330 can be configured to extend a quarantine time period of a virtual resource in a quarantined portion of a data center (so that the virtual resource is not moved to a non-quarantined portion of the data center) when a performance metric of the virtual resource falls below or exceeds a specified threshold value.

In some embodiments, a quarantine time period can be a few hours to several months. In some embodiments, a quarantine time period can be 90 days. In some embodiments, a quarantine time period can be dynamically determined based on performance of a virtual resource within a quarantined portion of a data center. In some embodiments, a quarantine time period can be based on a hardware and/or software resource combination used to operate a virtual resource. For example, the quarantine time period can be defined based on a reliability, type, size, and/or so forth of a particular hardware and/or software resource combination.

In some embodiments, the quarantine module 330 can be configured to collect metrics related to a virtual resource, and can be configured to modify hardware resource and/or software resources allocated to the virtual resource in a production environment (e.g., a non-quarantined portion) of the data center. For example, the quarantine module 330 can be configured to increase or decrease a number of data center units that may be allocated to operate the virtual resource based on a metric collected by the quarantine module 330 from operation of the virtual resource within a quarantine portion of the data center.

In some embodiments, the quarantine module 330 can be configured to store metrics in a database (not shown). The metrics in the database can be analyzed by the quarantine module 330 and then used by the quarantine module 330 to move virtual resources from a quarantined portion of a data center to a non-quarantined portion of the data center in a desirable fashion. For example, the quarantine module 330 can be configured to modify the resources (hardware resources and/or software resources) of a data center that will be used to operate a virtual resource based on metrics stored in the database, which may differ from the resources previously identified by assessment module 310.

In some embodiments, the quarantine module 330 can be configured to modify automatically a behavior of a first virtual resource based on a metric related to a second virtual resource mutually exclusive from the first virtual resource. For example, the quarantine module 330 can be configured to terminate, reconfigure, or pause operation of a first virtual resource when a performance metric of a second virtual resource falls below or exceeds a specified threshold value (e.g., exceeding a failure rate).

In some embodiments, the quarantine module 330 can be configured to collect metrics related to a first virtual resource so that a user can modify an assessment related to a second virtual resource. For example, the quarantine module 330 can be configured collect a metric of a first virtual machine that can be used to modify an assessment parameter value or define a new assessment parameter value. The modified or new assessment parameter value can be used by the assessment module 310 to identify software resources and/or hardware resources of a data center that can be used to operate a second virtual machine associated with a migration source. In other words, the metrics collected by the quarantine module 330 can be used by the assessment module 310 as feedback data that can be used by the assessment module 310 to make future assessments.

In some embodiments, the assessment module 310 and the quarantine module 330 can be configured to collectively refine assessment parameter values used to make assessments of data center resources to operate virtual machines. In some embodiments, the assessment module 310 and/or the quarantine module 330 can be configured to track deviations from historical performance metrics (and/or assessment parameter values) of data center resources so that future assessments can be improved. For example, an assessment module 310 can be configured to identify based on an assessment parameter value that a first combination of hardware and software resources (e.g., a specific combination of host device type and hypervisor platform) should be used to operate a first virtual resource of a first type emulating (or replicating) a migration source. After the first virtual resource has operated for a period of time within a quarantined portion of a data center, the quarantined module 330 can be configured to determine based on a metric associated with performance of the first virtual resource within the quarantined portion of the data center that a second combination of hardware and/or software resources operating the first virtual resource improves the performance of the first virtual resource. This information can be sent to the assessment module 310 and can be used to modify the assessment parameter value so that the assessment module 310 will identify, based on the modified assessment parameter value, the second combination of hardware and software resources for allocation to a second virtual resource of the same type.

In some embodiments, the metrics collected by the quarantine module 330 with respect to one or more virtual resources operating in a quarantined portion of a data center can be compared with a benchmark calculated based on the virtual resource(s), other virtual resources, a migration source, and/or so forth, during an assessment phase, a specification limit, and/or data related to one or more virtual resources operating within a non-quarantined portion of the center. In some embodiments, the benchmark can be based on simulations and/or empirical data (e.g., empirical data based on operation of a migration source or virtual resource). The comparison can be used to modify the operation of the virtual resource(s) within the quarantined portion of the data center, modify an assessment (performed by the assessment module 310) related to another virtual resource, modify one or more data center resources allocated to the virtual resource(s) for operation within a non-quarantined portion of the data center. For example, if the performance of a virtual resource in the quarantined portion of the data center exceeds expectations compared with a benchmark measurement of the virtual resource during the assessment phase, a number of data center resources allocated to operate the virtual resource can be decreased and re-allocated to (e.g., assigned to) another virtual resource.

In some embodiments, the quarantine module 330 can be configured to manage the quarantined portion of the data center. For example, the quarantine module 330 can be configured to manage configuration profiles and/or files related to virtual resources (e.g., virtual machines) operating within a quarantined portion of a data center. In some embodiments, the quarantined module 330 can be configured to prevent virtual resources within separate quarantined portions of the data center from affecting one another in an undesirable fashion. For example, the quarantined module 330 can be configured to isolate certain files of quarantined virtual resource from non-quarantined files of a virtual resource.

In some embodiments, the quarantine module 330 can be configured to identify a portion of software and/or hardware resources within a data center that can be used to host virtual resources (e.g., a set of virtual resources) that have been identified as virtual resources that are to be quarantined. In some embodiments, the quarantine module 330 can be configured to designate portions of the data center as reserved for operating quarantined virtual resources, so that those portions of the data center will not be used for other purposes. In such embodiments, the portions of the data center can be represented to other resources associated with the data center (such as other modules within the onboard engine 300) as being unavailable.

In some embodiments, the quarantine module 330 can be configured to prevent a virtual resource operating within a quarantined portion of a data center from being moved to a non-quarantined portion of the data center when a performance metric of the virtual resources does not satisfy a threshold condition. For example, if a utilization rate of a virtual resource (when operating within the quarantined portion of the data center) is too low, or if a failure rate of the virtual resource (when operating within the quarantined portion of the data center) is too high, the quarantine module 330 can be configured to prevent the virtual resource from being moved into the non-quarantined portion of the data center. In some embodiments, movement can be prevented even if a quarantine time period has expired. In some embodiments, the virtual resource may not be moved from the quarantined portion of the data center to the non-quarantined portion of the data center unless authorized to do so by the quarantine module 330.

The management module 340 can be configured to handle various management functions related to the virtual resources after the virtual resources have been moved to a production portion (e.g., a non-quarantined portion) of a data center during, for example, a management phase (such as the management phase 240 shown in FIG. 2) of a migration process. In other words, the management module 340 can be configured to manage the operations (e.g., day-to-day operations, sustained operations) of virtual resources in a production environment of the data center. In some embodiments, the hardware and/or software resources that are used to operate a virtual resource within a non-quarantined portion (e.g., production environment) of a data center can be the same as the hardware and/or software resources used to operate a virtual resource within a quarantined portion of a data center.

In some embodiments, for example, the management module 340 can be configured to manage migrations of one or more virtual resources between hosts in a production environment of the data center. In some embodiments, the management module 340 can be configured to manage migrations of one or more virtual resources between clusters of a data center. More details related to migration of virtual resources are set forth in co-pending patent application Ser. No. 12/709,943, filed on same date, entitled, "Methods and Apparatus for Movement of Virtual Resources within Data Center Environment," which is incorporated herein by reference in its entirety. The management module 340 can be configured manage data recover and/or failover related to virtual resources operating in the production environment of the data center.

In some embodiments, the management module 340 can be configured to perform management functions related to virtual resources regardless of the platform used to operate the virtual resources. For example, the management module 340 can be configured to perform management functions related to virtual resources independent of a hypervisor platform within which the virtual resources are functioning. More details related to a management module configured to operate independent of a hypervisor platform are set forth in co-pending patent application Ser. No. 61/306,752, filed on same date, entitled, "Methods and Apparatus for Data Center Management Independent of Hypervisor Platform," which is incorporated herein by reference in its entirety.

In some embodiments, the user interface 370 can be a user interface associated with, for example, a personal computer, a server, a mobile device (e.g., a personal digital assistant (PDA), mobile phone). Although not shown, in some embodiments, the onboard engine 300 can be accessed by the user interface 370 via a network (e.g., a wide area network (WAN), a local area network (LAN), a mobile network such as a 3G mobile network). In some embodiments, the user interface can be integrated into and/or directly attached to the onboard engine 300. In some embodiments, the user interface can be integrated into and/or directly attached to a processing device(s) configured to execute the onboard engine 300 (e.g., execute one or more functions of the onboard engine 300).

Figure 4:
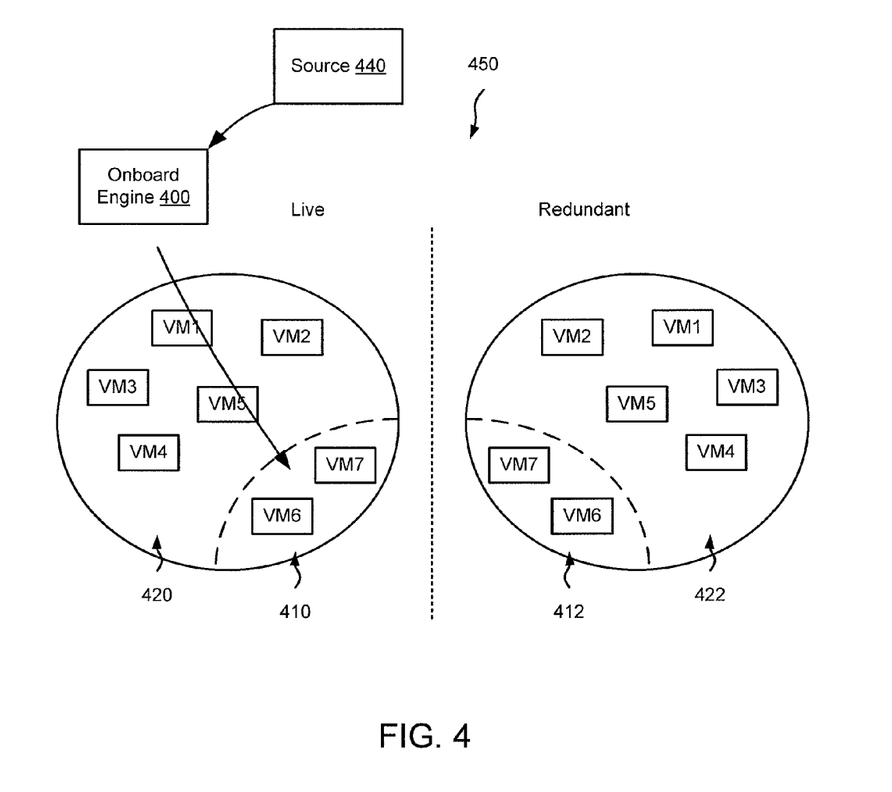
FIG. 4 is a schematic diagram that illustrates an onboard engine configured to facilitate migration of a source to virtual resources within a quarantined portion of a data center, according to an embodiment.

FIG. 4 is a schematic diagram that illustrates an onboard engine 400 configured to facilitate migration of a source 440 to virtual resources within a quarantined portion 410 of a data center 420, according to an embodiment. Specifically, as shown in FIG. 4, the onboard engine 400 is configured to facilitate migration of the source 440 as virtual resources VM6 and VM7 within the quarantined portion 410 of the data center 450 so that the virtual resources VM6 and VM7 can be monitored by the onboard engine 400 during a quarantine time period. As shown in FIG. 4 virtual resources VM1 through VM5 are operating within a non-quarantined portion 420 of the data center 450. In some embodiments, the virtual resources VM6 and VM7 can be referred to as quarantined virtual resources and the virtual resources VM1 through VM5 can be referred to as non-quarantined virtual resources.

As shown in FIG. 4, the data center 450 has a live side and a redundant side (which functions as a back-up). The quarantined portion 410 of the data center 450 and the non-quarantined portion 420 of the data center 450 in the live side of the data center 450 are mirrored in the redundant side of the data center 450. The redundant side of the data center 450 operates substantially in parallel with the live side of the data center 450 so that if a portion of the live side of the data center 450 were to fail, the state of the failed portion of the data center 450 can be restored and/or so that the operation of the data center 450 can be substantially maintained without undesirable disruption. As shown in FIG. 4, the non-quarantined portion 420 of the data center 450 and the quarantined portion 410 of the data center 450 (on the live side of the data center 450) are mirrored on the redundant side of the data center 450 as non-quarantined portion 422 of the data center 450 and quarantined portion 412 of the data center 450, respectively.

As illustrated by the dashed line between the quarantined portion 410 of the data center 450 and the non-quarantined portion 420 of the data center 450, the quarantined portion 412 of the data center and the non-quarantined portion 422 of the data center 450 are physically separated. In some embodiments, the virtual resources VM6 and VM7 can be configured to operate on, for example, host devices that are configured to only operate quarantined virtual resources. In other words, the host devices used to operate (e.g., host) the quarantined virtual resources VM6 and VM7 are configured so that they also do not operate non-quarantined virtual resources such as virtual resources VM1 through VM5. The quarantined virtual resources VM6 and VM7 are physically separated (e.g., physically installed on different physical devices) from the non-quarantined virtual resources VM1 through VM5. In some embodiments, the host devices (or portions thereof) that are dedicated to operating the quarantined virtual resources can have a set of communication ports that are dedicated to signaling associated with the virtual resources. In other words, the host devices (or portions thereof) that are dedicated to operating the quarantined virtual resources can have a set of communication ports that do not handle signaling associated with non-quarantined virtual resources.

The quarantined virtual resources VM6 and VM7 are physically separated from the non-quarantined virtual resources VM1 through VM5 so that the quarantined virtual resources VM6 and VM7 can be monitored to determine whether or not one or more of the quarantined virtual resources VM6 and VM7 can operate in a desirable fashion within the data center 450 and/or will adversely impact performance of the non-quarantined portions 420, 422 of the data center 450. The monitoring can be performed to determine whether or not the quarantined virtual resources VM6 and VM7 can be released for operation within the non-quarantined portion 420, 422 (e.g., production environment) of the data center 450 in a desirable fashion (e.g., safe fashion).

Although the non-quarantined portion 420, 422 of the data center 450 and the quarantined portion 410, 412 of the data center 450 are physically separated from one another, the non-quarantined portion 420, 422 of the data center 450 and the quarantined portion 410, 412 of the data center 450 are in communication with one another. For example, in some embodiments, virtual resource VM1 (in the quarantined portion 410, 412 of the data center 450) can be configured to send one or more data packets to virtual resource VM5 (in the quarantined portion 420, 422 of the data center 450), and vice versa.

Although not shown in FIG. 4, in some embodiments, each side (live and redundant of) a data center can have multiple quarantined portions that are isolated from one another. For example, a first quarantined portion of a data center can be mutually exclusive from a second quarantined portion of the data center.

In some embodiments, the quarantined portion 410, 412 of the data center 450 and the non-quarantined portion 420, 422 of the data center 450 can be managed by a single management module (not shown). In some embodiments, the quarantined portion 410, 412 of the data center 450 can be managed by a management module (not shown) different than a management module (not shown) configured to manage the non-quarantined portion 420 of the data center 450.

Figure 5:
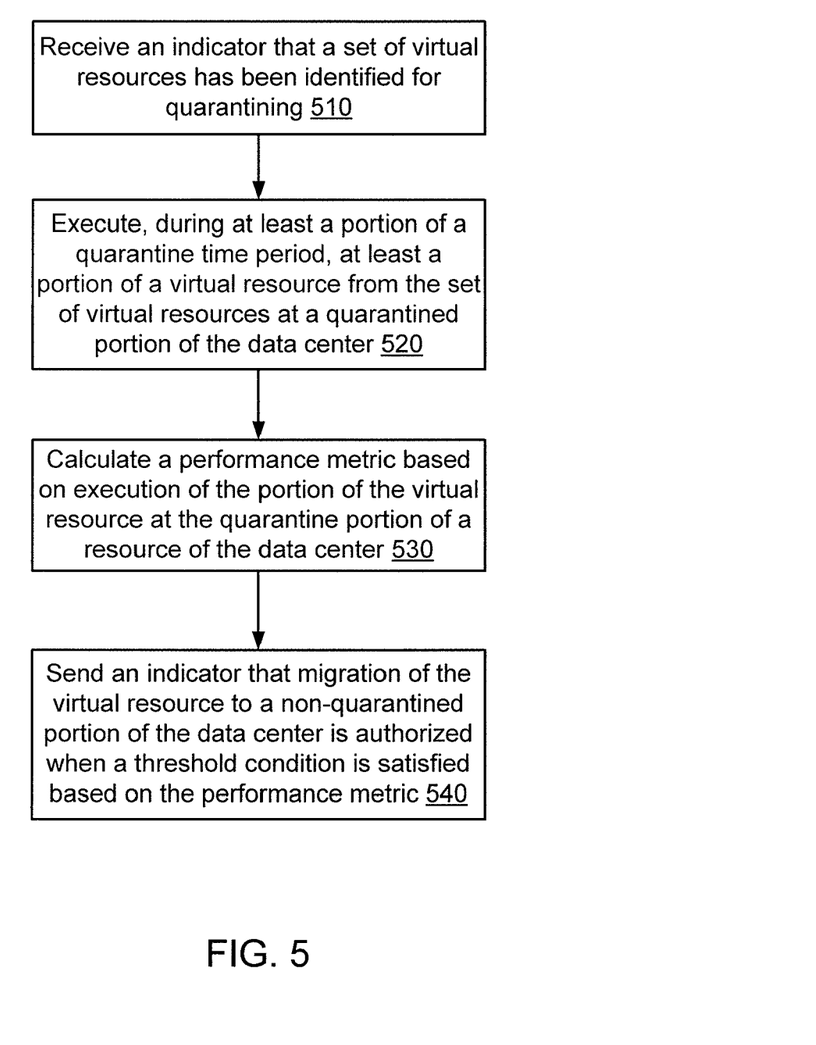
FIG. 5 is a flowchart that illustrates processing related to a quarantined portion of a data center, according to an embodiment.

FIG. 5 is a flowchart that illustrates processing related to a quarantined portion of a data center, according to an embodiment. As shown in FIG. 5, an indicator that a set of virtual resources has been identified for quarantining is received, at 510. In some embodiments, the indicator can be received at a quarantine module from an assessment module and/or the conversion module. In some embodiments, the indicator can be received from a user interface in response to an input from a user through a user interface.

During at least a portion of a quarantine time period, at least a portion of a virtual resource from the set of virtual resources is executed at a quarantined portion of the data center, at 520. In some embodiments, the virtual resource operating within the quarantined portion of the data center can be managed by a quarantine module. In some embodiments, the quarantine time period can be less than an hour or more than several weeks.

A performance metric is calculated based on execution of the portion of the virtual resource at the quarantine portion of a resource of the data center, at 530. In some embodiments, the resource can be a hardware resource and/or a software resource. In some embodiments, the performance metric can be, for example, a utilization value, a failure rate, and/or so forth.

An indicator that migration of the virtual resource to a non-quarantined portion of the data center is authorized when a threshold condition is satisfied based on the performance metric is sent, at 540. In some embodiments, a quarantine module can be configured to prevent a virtual resource from being moved to a non-quarantined portion of a data center in response to an indicator representing a performance metric.

Figure 6:
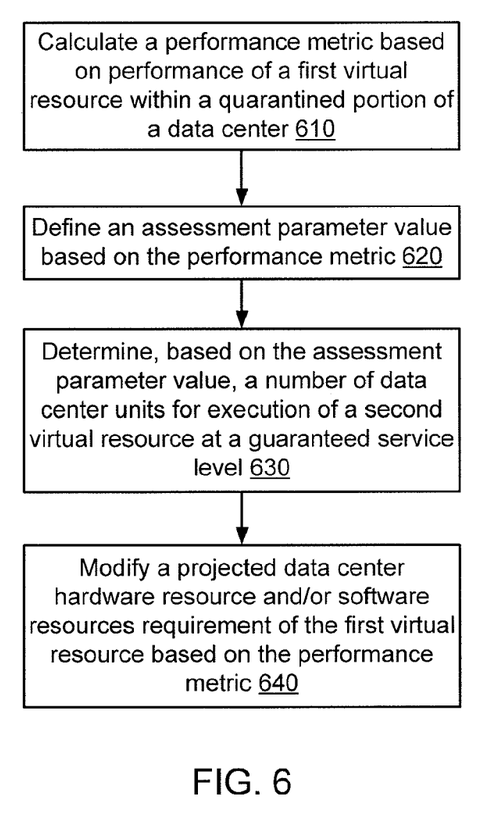
FIG. 6 is flowchart that illustrates method for processing feedback related to a quarantined portion of a data center, according to an embodiment.

FIG. 6 is flowchart that illustrates method for processing feedback related to a quarantined portion of a data center, according to an embodiment. As shown in FIG. 6, a performance metric is calculated based on performance of a first virtual resource within a quarantined portion of a data center, at 610. The performance metric can be based on, for example, a particular fashion in which the first virtual resource is executing within the quarantined portion of the data center.

An assessment parameter value is defined based on the performance metric, at 620. In some embodiments, the assessment parameter value can be a parameter value used by an assessment module to identify (e.g., select, determine, project) data center hardware resource and/or software resource requirements (such as a number of data center units required) for migration of at least a portion of a migration source to a virtual resource (or set of virtual resources) of a data center environment.

Based on the assessment parameter value, a number of data center units for execution of a second virtual resource at a guaranteed service level is determined, at 630. In some embodiments, the data center units can be managed based on a set of predefined hardware limit values.

A projected data center hardware resource and/or software resource requirement of the first virtual resource is modified based on the performance metric, at 640. In some embodiments, the first virtual resource, when migrated to a non-quarantined portion of the data center, can be operated within a portion of a data center defined by the modified data center hardware resource and/or software resource requirement.

Figure 7:
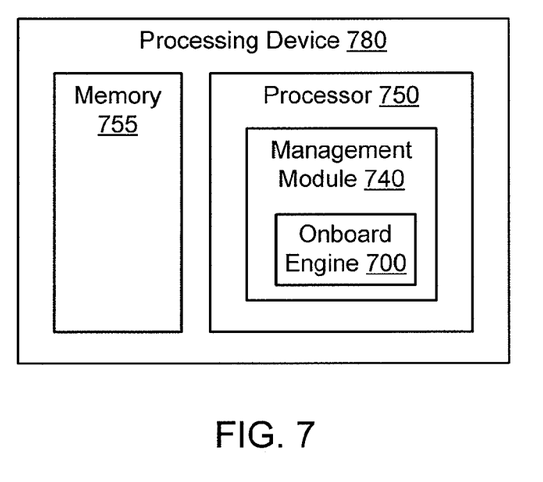
FIG. 7 is a schematic diagram that illustrates a processing device that includes a memory and a processor, according to an embodiment.

FIG. 7 is a schematic diagram that illustrates a processing device 780 that includes a memory 755 and a processor 750, according to an embodiment. As shown in FIG. 7, the management module 740, which includes an onboard engine 700, can be configured to execute within the processor 750. In some embodiments, the processor 750 can include a memory (not shown). In such instances, the memory 755 (also can be referred to as a memory component) can be optionally included in the processing device 780. The management module 740 and the onboard engine 700 can be configured to access (e.g., use) the memory 755 to perform their respective functions. In some embodiments, the processing device 780 can be, for example, a computer system, a server, a host device, a router, a switch device, and/or so forth included in a data center (such as data center 120 shown in FIG. 1). Although not shown, in some embodiments, the management module 740 and/or the onboard engine 700 can be configured so that they execute on multiple processors and/or use multiple memory components.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using, for example, a run-time environment and/or an application framework such as a Microsoft .NET framework and/or other programming languages (e.g., object-oriented programming languages) and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, multiple onboard engines can be configured to cooperatively handle migration of one or more migration sources into one or more data center environments (e.g., into one or more virtual resources operated within one or more data center environments).

What is claimed is:

1. One or more non-transitory processor-readable media storing code representing instructions to be executed by a processor, the code comprising code to:

process an indicator that a set of virtual resources has been identified for quarantine at a portion of a data center;

execute, during at least a portion of a quarantine time period, at least a portion of a virtual resource from the set of virtual resources at a quarantined portion of the data center that is dedicated to execute the set of virtual resources in response to the indicator and not execute virtual resources associated with non-quarantine operation;

monitor a performance metric based on execution of the portion of the virtual resource at the quarantined portion of the data center during the quarantine time period;

process an indication that migration of the virtual resource to a non-quarantined portion of the data center is authorized, when a threshold condition is satisfied based on the performance metric; and process instructions to migrate the virtual resource to the non-quarantined portion of the data center.

2. The processor-readable media of claim 1, wherein the quarantined portion of the data center includes a set of communication ports dedicated to signaling associated with the set of virtual resources.

3. The processor-readable media of claim 1, wherein the quarantined portion of the data center is physically separate from a non-quarantined portion of the data center, the quarantined portion of the data center is configured to communicate with the non-quarantined portion of the data center via a link.

4. The processor-readable media of claim 1, further comprising code to:

calculate a performance metric based on execution of the portion of the virtual resource at the quarantined portion of the data center during the portion of the quarantine time period; and modify a size of the quarantined portion of the hardware based on the performance metric.

5. The processor-readable medium of claim 1, wherein the quarantined portion of the data center is sized based on an integer number of data center units, each of the data center units is managed based on a predefined set of hardware resource limit values.

6. The processor-readable media of claim 1, wherein the quarantine time period is greater than one month.

7. The processor-readable media of claim 1, wherein the quarantined portion of the data center includes at least one host device.

8. The processor-readable media of claim 1, wherein execution of the at least the portion of the virtual resource at the quarantined portion of the data center is redundantly mirrored at a second portion of the data center.

9. The processor-readable media of claim 1, wherein the set of virtual resources are derived from a non-virtualized system mutually exclusive from the data center.

10. An apparatus, comprising:

one or more non-transitory computer readable media comprising computer readable instructions configured to cause one or more processing components to execute a method involving migration of customer resources to virtual resources, the method comprising:

determining, via an assessment module, a number of data center units to operate a set of virtual resources at a guaranteed service level, each of the data center units being managed based on a predefined set of hardware resource limit values;

sending, via a migration module, an indicator that the set of virtual resources has been moved to a quarantined portion of a data center;

monitoring, via a quarantine module, a performance metric related to operation of the set of virtual resources at the quarantined portion of the data center during a quarantine time period;

processing an indication that migration of the virtual resource to a non-quarantined portion of the data center is authorized, when a threshold condition is satisfied based on the performance metric; and processing instructions regarding migration of virtual resource to a non-quarantined portion of the data center.

11. The apparatus of claim 10, the method further comprising:

modifying, via a management module, processing of a signal by at least one virtual resource from the set of virtual resources after the set of virtual resources have been moved from the quarantined portion of the data center to a non-quarantined portion of the data center mutually exclusive from the quarantined portion of the data center.

12. The apparatus of claim 10, wherein the set of virtual resources is a first set of virtual resources, the assessment module is configured to determine a virtualization environment for the first set of virtual resources based on performance of a second set of virtual resources within the quarantined portion of the data center.

13. The apparatus of claim 10, wherein the set of virtual resources is a first set of virtual resources, the assessment module is configured to determine the number of data center units based on a feedback signal, the feedback signal is based on performance of a second set of virtual resources within the quarantined portion of the data center.

14. The apparatus of claim 10, wherein the number of data center units is a minimum number of data center units.

15. The apparatus of claim 10, wherein the assessment module is configured to determine the number of data center units based on a plurality of responses to a questionnaire received from a user node.

16. The apparatus of claim 10, wherein the migration module is configured to facilitate movement of at least a portion of the virtual resources to the quarantined portion based on a predefined standard.

17. One or more non-transitory processor-readable media storing code representing instructions to be executed by a processor, the code comprising code to:

monitor a performance metric representing performance of a first virtual resource within a quarantined portion of a data center during at least a portion of a quarantine time period;

define an assessment parameter value based on the performance metric;

determine, based on the assessment parameter value, a number of data center units for execution of a second virtual resource at a guaranteed service level, each of the data center units being managed based on a predefined set of hardware resource limit values; and modify, based on the performance metric, a projected hardware requirement of the first virtual resource within a production environment of the data center;

wherein the first virtual resource, when migrated to a non-quarantined portion of the data center, can be operated within a portion of the data center defined by the modified projected hardware requirement.

18. The processor-readable media of claim 17, wherein the statistic is calculated at a first time, the number of data center units is determined at a second time after the first time.

19. The processor-readable media of claim 17, wherein the quarantined portion of the data center is a first quarantined portion of the data center, the second virtual resource is migrated to a second quarantined portion of the data center defined at least in part by the number of data center units.

20. A method for processing feedback related to a quarantined portion of a data center, the method comprising:

monitoring a performance metric representing performance of a first virtual resource within a quarantined portion of a data center during at least a portion of a quarantine time period;

defining an assessment parameter value based on the performance metric;

determining, based on the assessment parameter value, a number of data center units for execution of a second virtual resource at a guaranteed service level, each of the data center units being managed based on a predefined set of hardware resource limit values; and modifying, based on the performance metric, a projected hardware requirement of the first virtual resource within a production environment of the data center;

wherein the first virtual resource, when migrated to a non-quarantined portion of the data center, can be operated within a portion of the data center defined by the modified projected hardware requirement.

21. The method of claim 20, further comprising configuring a quarantine module to prevent one or more virtual resources from being moved to the non-quarantined portion of the data center.

22. The method of claim 20, wherein the statistic is calculated at a first time, the number of data center units is determined at a second time after the first time.

23. The method of claim 20, wherein the quarantined portion of the data center is a first quarantined portion of the data center, the second virtual resource is migrated to a second quarantined portion of the data center defined at least in part by the number of data center units.

24. The method of claim 22, wherein the statistic is calculated at a first time, the number of data center units is determined at a second time after the first time.

25. The method of claim 23, further comprising configuring a quarantine module to prevent one or more virtual resources from being moved to the non-quarantined portion of the data center.

* * * * *